2,954,729
PIE SHELL FORMING DEVICE

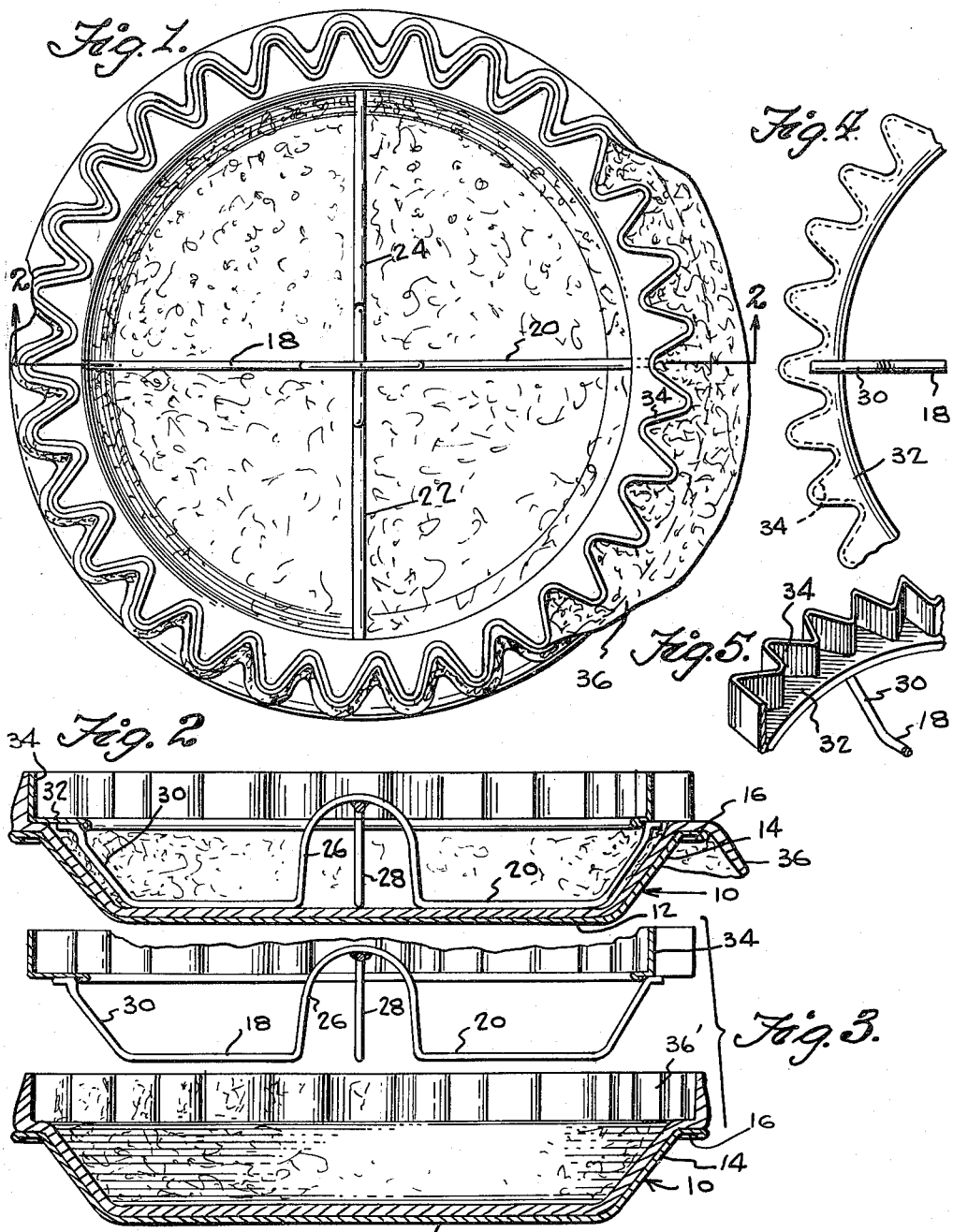

Catherine G. Suica, Langeloth, Pa.
(221 Clark Ave., Burgettstown, Pa.)

Filed Aug. 23, 1957, Ser. No. 679,907

2 Claims. (Cl. 99—436)

The present invention relates generally to cooking utensils and specifically to a pie shell forming device for use with a pie pan.

An object of the present invention is to provide a pie shell forming device which lends itself to ready forming of a pie shell having a fluted rim.

Another object of the present invention is to provide a pie shell forming device which holds a pie shell against shrinkage while being baked.

A further object of the present invention is to provide a pie shell forming device which is of sturdy construction, one simple in structure, and one commercially feasible.

These and other objects and advantages of the present invention will be fully apparent from the following description when taken in connection with the annexed drawing, in which:

Figure 1 is a plan view of the pie shell forming device according to the present invention, shown in place upon a preformed sheet of pie dough, the dough having a portion not pressed against the serrated rim of the device;

Figure 2 is a sectional view taken on the line 2—2 of Figure 1;

Figure 3 is an exploded sectional view showing the device of the present invention removed from the associated pie pan, leaving the formed pie shell therein;

Figure 4 is a fragmentary bottom plan view; and

Figure 5 is an isometric fragmentary view of a portion of the device.

Referring in greater detail to the drawing in which like numerals indicate like parts throughout the several views, a pie shell forming device according to the present invention fits in a pie pan designated by the reference numeral 10 and having a bottom 12 and a wall 14 extending about the perimeter of the bottom 12. A horizontally disposed flange 16 is carried by the upper end of the wall 14.

A plurality of base bars 18, 20, 22, and 24, are arranged in radial spaced relation and are horizontally disposed. The inner ends of the base bars are spaced from each other and an upstanding handle means, consisting in a pair of connectors 26 and 28, is connected to the inner ends of the base bars 18, 20, 22, and 24. The base bars 18 and 20 consist in one pair arranged in end to end aligned spaced relation with the other base bars 22 and 24 positioned on each side of the base bars 18 and 20 midway of the space between the adjacent ends of the base bars 18 and 20 and perpendicular with respect to the base bars 18 and 20.

The connectors 26 and 28 are each of inverted U-shape and are arranged in criss-cross relation and are secured together at the criss-cross point. The free ends of the connectors 26 and 28 are formed integrally with or attached to the adjacent ends of the base bars 18, 20, 22, and 24.

A supporting element, or post 30, rises from the end of each of the other ends of the base bars 18, 20, 22, and 24, and extends in an upwardly and outwardly sloping direction, the outer ends of the base bars being formed integrally with the lower end of the associated post 30.

A flat ring 32 extends about and is carried by the upper ends of all of the posts 30 and an upstanding serrated rim 34 extends about the outer perimeter of the ring 32 and is carried by the ring 32. The outer perimeter of the ring 32 is notched to conform to the serrations in the rim 34.

When the device of the present invention is in use, it is positioned within the pan 10 so that the base bars 18 and 20 and 22 and 24 are contiguous to the bottom 12 of the pan 10 with the posts 30 adjacent to the pan wall 14 and the flat ring 32 of the device is above and adjacent to the pan flange 16. A preformed sheet of pie dough, as at 36, is placed in the pan 10 before placing therein of the device of the present invention. The base bars 18, 20, 22, and 24 and the posts 30 bear against the preformed pie dough, in the form of a shell, when the latter is disposed in the pan 10. The portion of the dough 36 adjacent the perimeter, when manually pressed against the outer face of the rim 34, is formed in flutes by the rim 34 and adheres thereto so that the rim 34 supports the adjacent portion of the dough 36 against shrinkage while the shell formed by the dough 36 is being baked. The horizontally disposed base bars serve to keep the shell flat against the pan bottom 12 and prevent it from having upwardly extending air pockets or bubbles which frequently occur when pie shells of this type are being baked.

After the shell has been baked, the pie shell forming device is easily lifted by means of the handle formed by the U-shaped connectors 26 and 28 upwardly out of the formed shell, designated by the reference numeral 36' in Figure 3, and the shell may then be filled with the pie filling as desired.

While only a preferred embodiment of the present invention has been shown and described, other embodiments are contemplated and numerous changes and modifications may be made therein without departing from the spirit of the invention as set forth in the appended claims.

What is claimed is:

1. The combination with a pie pan having a bottom, a wall extending about the perimeter of said bottom, and a horizontally disposed flange carried by the upper end of said wall, of a pie shell forming device comprising a pair of base bars arranged in end to end aligned spaced relation, another base bar positioned on each side of said pair of base bars midway of the space between said base bar ends and perpendicularly with respect to said base bars, a pair of inverted U-shaped connectors arranged in criss-cross relation and secured together at the criss-cross point positioned in the space between the adjacent ends of said pair of base bars and said other bars and having the free ends of the legs attached to said adjacent ends, and a post rising from the end of each of said pair of base bars and of said other bars remote from said connectors, a flat ring extending about and carried by the upper ends of all of said posts, and an upstanding rim extending about the outer perimeter of said ring and carried by the latter, said device being positioned within said pan so that said pair of base bars and said other bars are contiguous to the pan bottom with the posts adjacent to the pan wall and the flat ring above and adjacent said pan flange, the pair of base bars and said other bars and said posts bearing against the preformed pie dough shell when disposed in said pan.

2. The combination with a pie pan having a bottom, a wall extending about the perimeter of said bottom, and a horizontally disposed flange carried by the upper end of said wall, of a pie shell forming device comprising a pair of base bars arranged in end to end aligned spaced relation, another base bar positioned on each side of said pair of base bars midway of the space between said base bar ends and perpendicularly with respect to said base bars, a pair of inverted U-shaped connectors arranged in criss-cross relation and secured together at the criss-cross point positioned in the space between the adjacent ends of said pair of base bars and said other bars and having the free ends of the legs attached to said adjacent ends, and a post rising from the end of each of said pair of base bars and of said other bars remote from said connectors, a flat ring extending about and carried by the upper ends of all of said posts, and an upstanding rim extending about the outer perimeter of said ring and carried by the latter, said device being positioned within said pan so that said pair of base bars and said other bars are contiguous to the pan bottom with the posts adjacent to the pan wall and the flat ring above and adjacent said pan flange, the pair of base bars and said other bars and said posts bearing against the preformed pie dough shell when disposed in said pan, said rim being adapted to form flutes in the portion of the preformed pie dough adjacent the perimeter thereof when manually pressed thereagainst and to support said dough portion against shrinkage while baking.

References Cited in the file of this patent

UNITED STATES PATENTS

| | | |
|---|---|---|
| 385,683 | Phelps | July 3, 1888 |
| 793,653 | Gorman | July 4, 1905 |
| 2,595,684 | Lyons | May 6, 1952 |
| 2,691,337 | Forrest | Oct. 12, 1954 |